April 24, 1934.  E. G. DE FOE ET AL  1,956,060
CURB SERVICE TRAY
Original Filed June 13, 1932   2 Sheets-Sheet 1
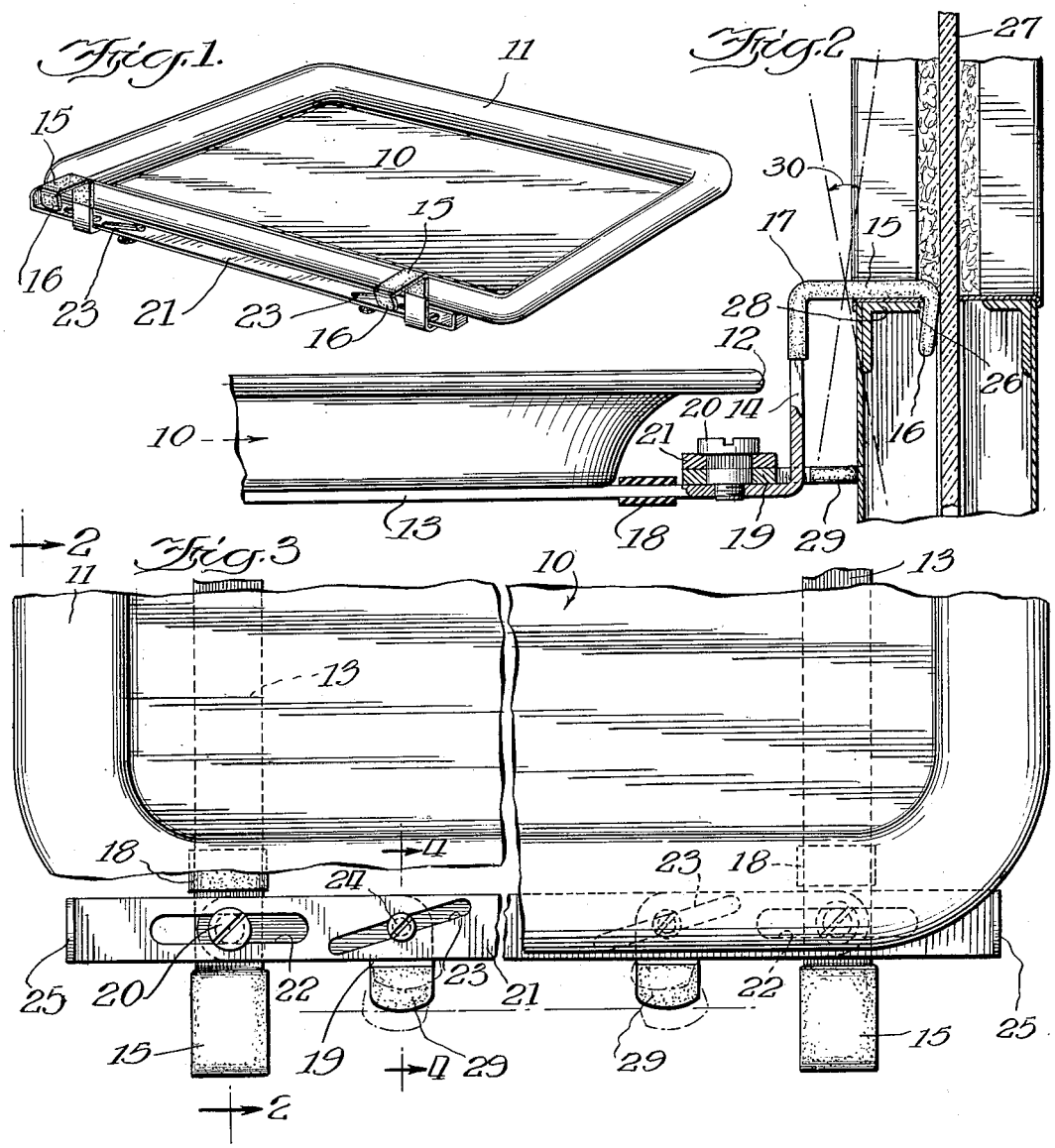
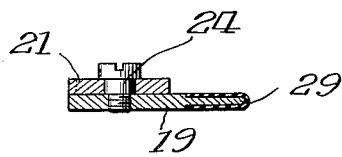
Inventors:
Edward G. De Foe
Carl Bramming
By Williams, Bradbury,
McCaleb & Hinkle Attys.

April 24, 1934.  E. G. DE FOE ET AL  1,956,060
CURB SERVICE TRAY
Original Filed June 13, 1932  2 Sheets-Sheet 2
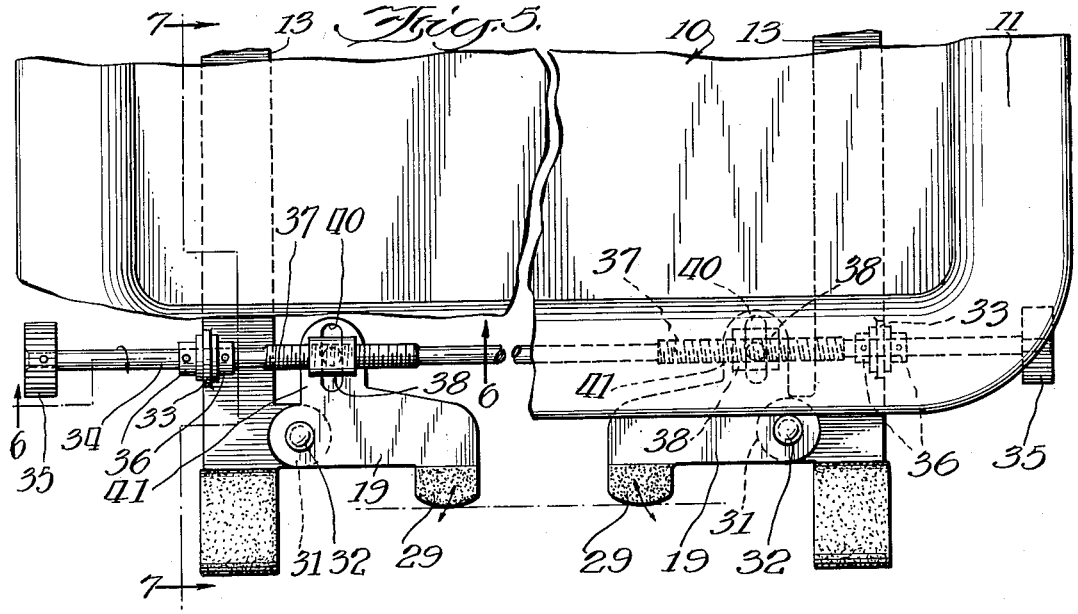
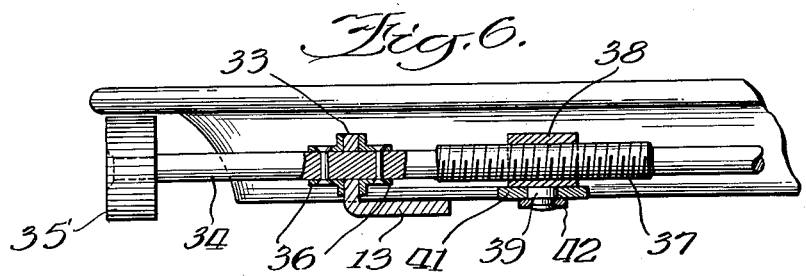
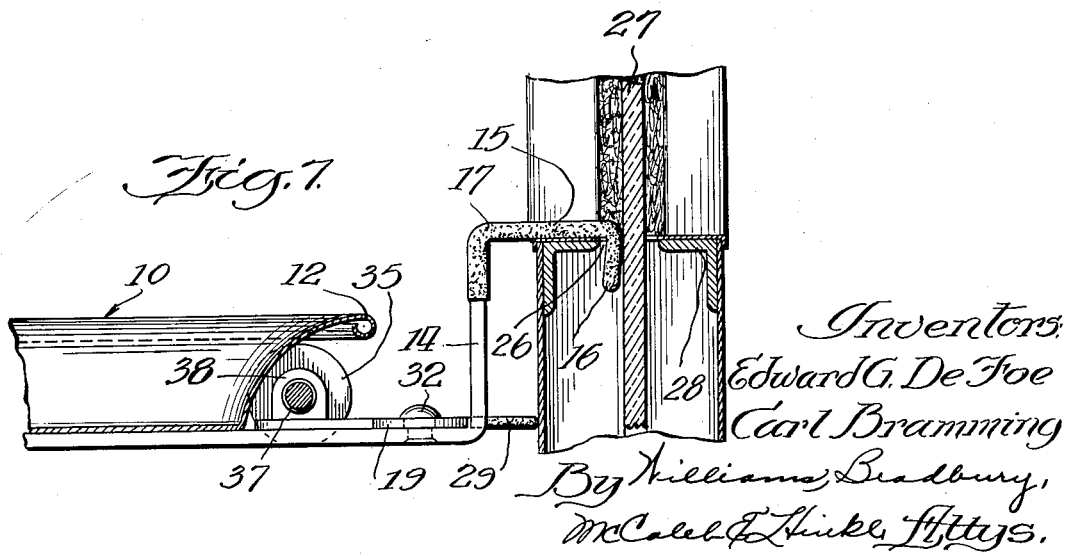
Inventors
Edward G. De Foe
Carl Bramming
By Williams, Bradbury,
McCaleb & Hinkle, Attys.

Patented Apr. 24, 1934

1,956,060

UNITED STATES PATENT OFFICE 1,956,060

CURB SERVICE TRAY

Edward G. De Foe, Oak Park, and Carl Bramming, Chicago, Ill., assignors to Red Boy, Inc., Chicago, Ill., a corporation of Delaware Application June 13, 1932, Serial No. 616,774
Renewed September 18, 1933

7 Claims. (Cl. 45—51)

This invention relates to curb service trays and particularly to trays adapted to serving refreshments to occupants of vehicles, primarily automobiles.

This invention relates to trays of the general type described and claimed in our co-pending application, Serial No. 588,074, filed January 22, 1932.

One of the objects of the invention is to provide a tray of this type in which the engaging elements, by means of which the tray is hung and supported, are located above the bottom of the tray so that the same may be placed on a table or other surface irrespective of the condition of adjustment of said elements.

Another object of the invention is to provide a tray comprising improved, simple and effective means for adjusting the supporting surface so as to enable the tray to be leveled when mounted on an automobile.

Further objects, advantages and capabilities of the invention will appear from the following description of preferred embodiments thereof, taken in conjunction with the accompanying drawings, in which Figure 1 is a perspective view of a tray embodying the invention;

Fig. 2 is a fragmentary view of the tray showing the manner in which the same may be mounted on the window sill of an automobile window of conventional type, the view being partly sectional, the section being taken on the line 2—2 of Fig. 3;

Fig. 3 is a fragmentary plan view partly broken away to show the operating mechanism more clearly;

Fig. 4 is a sectional detail view taken on the line 4—4 of Fig. 3;

Fig. 5 is a fragmentary plan view, partly broken away, of a further embodiment of the invention;

Fig. 6 is a sectional detail view taken on the line 6—6 of Fig. 5, and

Fig. 7 is a sectional detail view taken on the line 7—7 of Fig. 5.

Referring to the drawings, and particularly to Figs. 1 to 4, the tray 10 is preferably rectangular in form and is provided around its perimeter with a rim 11 which may be of arcuate form as shown in Fig. 2, or may be of any other desired shape. The edge of the rim 11 is rolled into a bead 12. Two straps 13 are secured to the underside of the tray 10, for example by welding. These straps project beyond one side of the tray and are turned upwardly to provide vertical lengths 14 and outwardly to provide horizontal lengths 15. The extremities of the straps are turned downwardly, and preferably a little inwardly, to provide hooked ends 16.

The horizontal lengths 15 and the hooked ends 16 are preferably provided with a cover 17, such as rubber, for the purpose of preventing marring of the surfaces of the car with which they come in contact. Similar pieces of covering 18 may be applied upon the bars 13 in order to prevent marring the flat surfaces on which the trays may be placed. Upon the projecting portions of the bars 13, within the vertical lengths 14, are mounted, upon vertical axes, abutment members 19 which are preferably formed from flat stock and lie in a plane parallel to that of the tray. The abutment members 19 are pivotally mounted upon the bars 13 by means of screws 20, and these members are directed inwardly towards each other in the manner shown in Fig. 3. Their innermost ends are turned outwardly away from the tray and are normally nearer the tray than are the hooked ends 16.

The abutment members 19 are actuated by a cam bar 21 which lies in the longitudinal direction of the tray and is provided with longitudinal slots 22 through which pass the screws 20. The heads of the screws 20 engage the upper surface of the bar 21 on each side of the slots 22 and hold it in position while permitting its longitudinal movement. The screws 20 have an enlarged stem portion which extends through the slots 22 and the openings in the ends of the abutment members 19. The extremities of the screws 20 are reduced and threaded, and are thereby mounted rigidly upon the bars 13. The bar 21 is provided with cam slots 23, both of which are similarly directed. They are preferably straight slots located at an acute angle with respect to longitudinal direction of the bar 21. The abutment members 19 carry screws 24 which extend through the slots 23 and are provided with enlarged heads which engage the surface of the bar 21 on either side of the slots 23.

At each end the bar 21 is provided with an upturned fingerpiece 25 whereby the bar may be moved longitudinally for the purpose of adjusting the inclination of the tray. It will readily be understood from Fig. 3 that if the bar 21 is pushed towards the left the abutment members 19 are projected outwardly, whereas if the bar 21 is moved towards the right the abutment members 19 are moved inwardly.

In operation, the hooked ends 16 are engaged upon any suitable part of the automobile. For example, they may be passed through the opening 26 normally present between the glass pane 27 and the trim 28 of the conventional automobile window. The abutment members 19 having been first moved inwardly, the tray is held level by hand and the cam bar 25 is actuated so as to bring the projecting ends 29 of the abutment member into engagement with the inner wall of the door in the manner shown in Fig. 2. The ends 29 may be provided with a covering of rubber or the like to avoid marring the surface of the automobile with which they come in contact. The extreme positions of the ends 29 of the abutment members 19 are indicated by dotted lines in Fig. 3. In Fig. 2 dot-and-dash lines are employed to indicate the degree of movement of the ends of the abutment members 19 in relation to the tray. From this figure it is clear that a movement equivalent to the angle 30 is permitted so that the tray may be adjusted into horizontal position notwithstanding that the position of the door may depart from the vertical by a substantial angle. The adjustment of the abutment members 19 also permits the tray to be employed in different locations and with different makes of automobiles, while still obtaining the desired horizontal adjustment of the tray.

The embodiment of the invention illustrated in Figs. 5, 6 and 7 is substantially similar to that described above, with the exception of the means for actuating the abutment members 19. Accordingly, similar parts are identified by the same reference numerals and the actuating means will now be described.

In this embodiment the straps 13 are provided adjacent the vertical length 14 with lugs 31 upon which the abutment members 19 are pivotally mounted, for example by means of rivets 32. The bars 13 are also provided with upturned lugs 33 which serve as bearings and supports for an actuating rod 34. The actuating rod 34 is provided at each end with a knurled button 35 whereby it may be rotated in either direction. The rod 34 is held against longitudinal movement by thrust collars 36 which are rigidly mounted thereon and which bear on either side of the lugs 33. Inside the lugs 33 the rod 34 is provided with threaded portions 37 upon which are mounted nut elements 38. These nut elements 38 comprise downwardly projecting portions 39 which extend into slots 40 provided in rearwardly directed extensions 41 of the abutment members 19. The nut elements 38 are held against rotation and the projections 39 are held within the slots 40 by means of washers 42 secured to the lower ends of the projections 39 and adapted to bear on the under side of the extensions 41.

It will readily be understood that by turning the buttons 35 in one direction the nut elements 38 are moved towards each other, while by turning them in the opposite direction the nut elements 38 are caused to move apart. In the first instance the projecting ends 29 of the abutment members 19 are moved outwardly, while in the second instance they are moved inwardly.

The operation of this embodiment of the invention is substantially similar to the embodiment above described, that is the tray is mounted by the hooked ends 16 in desired position. The tray is held level by the hand and one of the knurled buttons 35 is rotated in the appropriate direction to bring the ends 29 of the abutment members 19 into contact with the wall of the door or other surface.

It will be noticed that in both modifications all the operating parts, whereby the tray is hung and supported, are located above the lower faces of the bars 13 so that the trays may be laid upon flat surfaces without danger of scratching and marring them.

While the improved tray is intended primarily for employment in mounting on automobiles, it will be understood that it is not intended to limit the invention thereto, since the trays may be mounted in other locations.

Although the invention has been disclosed in connection with the specific details of perfered embodiments thereof, it must be understood that such details are not intended to be limitative of the invention except in so far as set forth in the accompanying claims.

Having thus described our invention, what we claim as new and desire to secure by Letters Patent of the United States is:

1. In combination, a tray, hooks rigidly secured thereto and projecting beyond one side of the tray, arms pivotally mounted on the tray on vertical axes and projecting outwardly towards said side, and adjustable means operable to change the amount of projection of said arms.

2. In combination, a tray, hooks rigidly secured thereto and projecting beyond one side of the tray, arms pivotally mounted on the tray on vertical axes and projecting outwardly towards said side, and cam means adapted to change the amount of projection of said arms.

3. In combination, a tray, hooks rigidly secured thereto and projecting beyond one side of the tray, arms pivotally mounted on the tray on vertical axes and projecting outwardly towards said side, and longitudinally slidable cam means adapted to change the amount of projection of said arms.

4. In combination, a tray, hooks rigidly secured thereto and projecting beyond one side of the tray, arms pivotally mounted on the tray on vertical axes and projecting outwardly towards said side, and rotatable means adapted to change the amount of projection of said arms.

5. In combination, a tray, straps secured to the underside of the tray projecting therebeyond, the projecting ends being turned downwardly to provide hooks, arms pivotally mounted on said straps on vertical axes, said arms being directed outwardly in the same direction as said hooks, and a bar mounted on said straps and adapted to slide in the longitudinal direction, said bar being provided with cam surfaces adapted to engage said arms and control their movements on their axes.

6. In combination, a tray, straps secured to the underside thereof and projecting beyond one side of the tray, the projecting extremities being formed into hooks, a bar rotatably mounted on said straps, said bar being provided with threaded portions, nut elements secured against rotation mounted on said threaded portions, and arms pivotally mounted on said straps on vertical axes and adapted to swing outwardly in the same direction as the hooks, said arms being engaged by said nut elements whereby the swinging of the arms may be effected by the rotation of the bar.

7. In combination, a tray, hooks carried by the tray and projecting beyond one side of the tray, an arm pivotally mounted on the tray on a vertical axis and projecting outwardly towards said side, and adjustable means operable to change the amount of projection of said arm.

EDWARD G. DE FOE.
CARL BRAMMING.